US012785183B2

(12) United States Patent
Yamamoto et al.

(10) Patent No.: US 12,785,183 B2
(45) Date of Patent: Nov. 3, 2026

(54) SECONDARY BATTERY AND ELECTRONIC DEVICE

(71) Applicant: MURATA MANUFACTURING CO., LTD., Kyoto (JP)

(72) Inventors: Mikio Yamamoto, Kyoto (JP); Hiromitsu Sennami, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 483 days.

(21) Appl. No.: 18/438,107

(22) Filed: Feb. 9, 2024

(65) Prior Publication Data

US 2024/0186625 A1 Jun. 6, 2024

Related U.S. Application Data

(63) Continuation of application No. PCT/JP2022/027433, filed on Jul. 12, 2022.

(30) Foreign Application Priority Data

Sep. 30, 2021 (JP) ................................ 2021-160869

(51) Int. Cl.
*H01M 50/153* (2021.01)
*H01M 50/109* (2021.01)
(Continued)

(52) U.S. Cl.
CPC ....... *H01M 50/153* (2021.01); *H01M 50/109* (2021.01); *H01M 50/186* (2021.01); *H01M 50/284* (2021.01); *H01M 50/588* (2021.01)

(58) Field of Classification Search
None
See application file for complete search history.

(56) References Cited

U.S. PATENT DOCUMENTS 6,617,069 B1 9/2003 Hopper et al.
2011/0064972 A1 3/2011 Park et al.
(Continued)

FOREIGN PATENT DOCUMENTS

JP H10275612 A 10/1998
JP 2002525806 A 8/2002
(Continued)

OTHER PUBLICATIONS

International Search Report of corresponding PCT application PCT/JP2022/027433, dated Oct. 4, 2022.

*Primary Examiner* — Kevin M Bernatz
(74) *Attorney, Agent, or Firm* — K&L Gates LLP

(57) ABSTRACT

A secondary battery is provided and including an outer can; an external terminal insulated from the outer can; a battery element that is housed in the outer can and has a first electrode and a second electrode; a first lid body having a first protrusion portion that protrudes toward an inside of the outer can; and a second lid body disposed to be electrically insulated from the first lid body, in which the first protrusion portion of the first lid body has an opening portion, the second lid body has a second protrusion portion that is electrically insulated from the first protrusion portion and penetrates the opening portion toward the inside of the outer can, and a circuit board is connected between the external terminal and the second lid body, and the external terminal, the second lid body, and the second electrode are electrically connected to each other, and the first lid body and the first electrode are electrically connected to each other.

13 Claims, 15 Drawing Sheets

(51) Int. Cl.

| | |
|---|---|
| ***H01M 50/186*** | (2021.01) |
| ***H01M 50/284*** | (2021.01) |
| ***H01M 50/588*** | (2021.01) |

(56) References Cited

U.S. PATENT DOCUMENTS

| | | | | |
|---|---|---|---|---|
| 2023/0071591 | A1* | 3/2023 | Sato | H01M 50/109 |
| 2024/0063519 | A1* | 2/2024 | Zhang | H01M 10/0427 |
| 2024/0136621 | A1* | 4/2024 | Chen | H01M 50/147 |
| 2024/0234837 | A1* | 7/2024 | Wang | H01M 10/052 |
| 2024/0356162 | A1* | 10/2024 | Kageyama | H01M 50/55 |
| 2026/0005348 | A1* | 1/2026 | Jang | H01M 50/166 |

FOREIGN PATENT DOCUMENTS

| | | | |
|---|---|---|---|
| JP | 2007305323 | A | 11/2007 |
| JP | 2008218193 | A | 9/2008 |
| JP | 2011505665 | A | 2/2011 |

* cited by examiner

A

B

A

B

A

B

SECONDARY BATTERY AND ELECTRONIC DEVICE

CROSS REFERENCE TO RELATED APPLICATIONS

The present application is a continuation of PCT patent application no. PCT/JP2022/027433, filed Jul. 12, 2022, which claims priority to Japanese patent application no. 2021-160869, filed on Sep. 30, 2021, the entire contents of which are incorporated herein by reference.

BACKGROUND

The present application relates to a secondary battery and an electronic device.

Secondary batteries such as lithium ion batteries are used in a wide range of applications. Such secondary batteries generally have a configuration including a circuit board in which an integrated circuit (IC), components such as a capacitor, and a resistor (hereinafter, these IC and components are collectively referred to as electronic components as appropriate) are mounted to ensure safety.

SUMMARY

The present application relates to a secondary battery and an electronic device.

A secondary battery requires a space for arranging electronic components mounted on the circuit board described above.

In the techniques described in the Background, consideration on the space for arranging the electronic components is insufficient, and as a result, there is a possibility that the secondary battery becomes larger.

The present application, in an embodiment, relates to providing a secondary battery having a space for efficiently arranging the electronic components and an electronic device having the secondary battery.

In an embodiment, a secondary battery is provided and including:

an outer can;

an external terminal insulated from the outer can;

a battery element that is housed in the outer can and has a first electrode and a second electrode;

a first lid body having a first protrusion portion that protrudes toward an inside of the outer can; and a second lid body disposed to be electrically insulated from the first lid body, in which the first protrusion portion of the first lid body has an opening portion, the second lid body has a second protrusion portion that is electrically insulated from the first protrusion portion and penetrates the opening portion toward the inside of the outer can, and a circuit board is connected between the external terminal and the second lid body, and the external terminal, the second lid body, and the second electrode are electrically connected to each other, and the first lid body and the first electrode are electrically connected to each other.

According to an embodiment, it is possible to provide a secondary battery having a space for efficiently arranging electronic components. As a result, it is possible to achieve miniaturization of the secondary battery. Note that, the contents of the present application are not to be construed as being limited by the effects exemplified in the present description.

DETAILED DESCRIPTION

Figure 1:
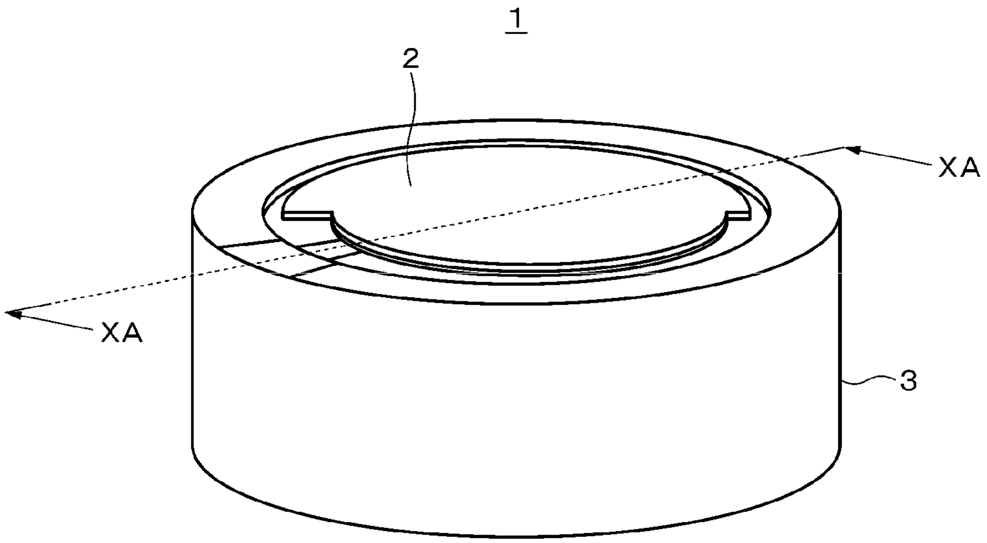
FIG. 1 is an overall view illustrating a secondary battery according to an embodiment.

The present technology will be described below in further detail including with reference to the drawings according to an embodiment. Unless otherwise described, the present technology is not intended to be limited to only dimensions, materials, and shapes of constituent members described herein, relative arrangements thereof, and descriptions of directions such as upward, downward, left, and right and the like, which are merely illustrative examples. Note that, sizes, positional relationships, and the like of the members illustrated in the drawings may be exaggerated for clarity of description, and, only some of the reference numerals may be illustrated, or a part of an illustration may be simplified, in order to prevent the illustration from being complicated. Furthermore, in the following description, the same names and reference numerals indicate the same or similar members, and redundant descriptions will be appropriately omitted.

Figure 3:
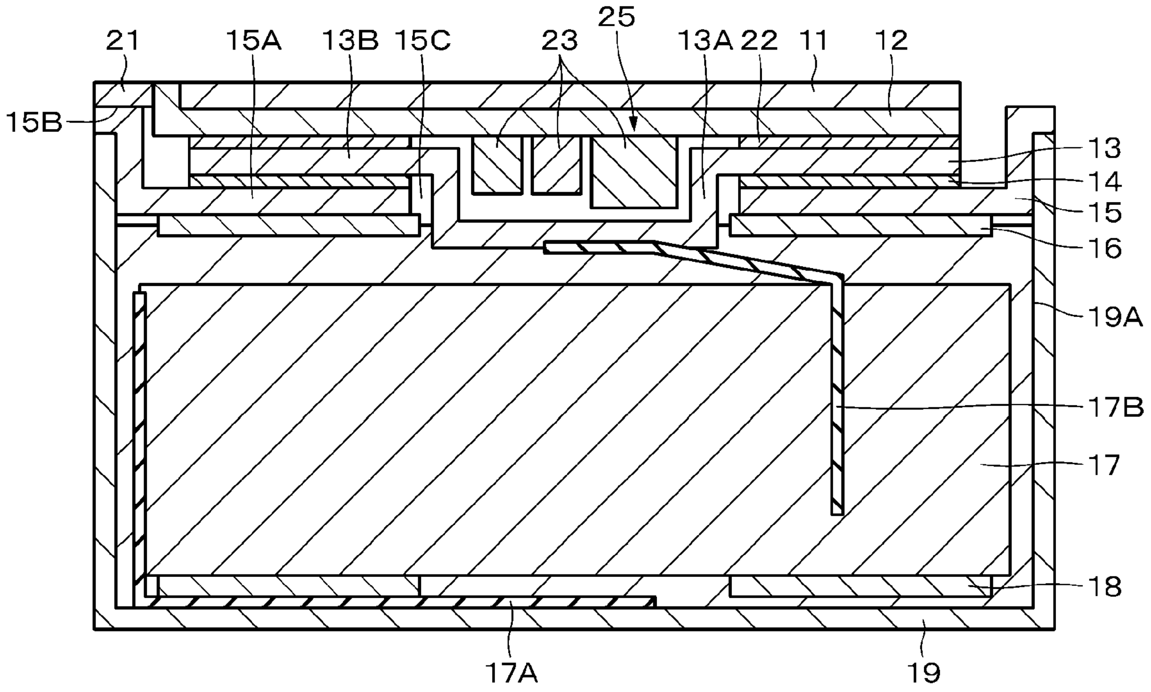
FIG. 3 is a sectional view of the secondary battery according to an embodiment.
Figure 4:
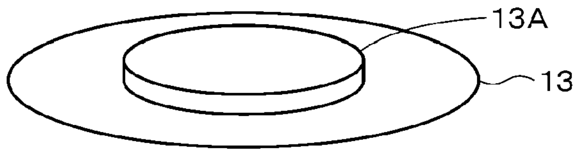
FIG. 4 is a diagram for describing a negative electrode lid according to an embodiment.
Figure 5:
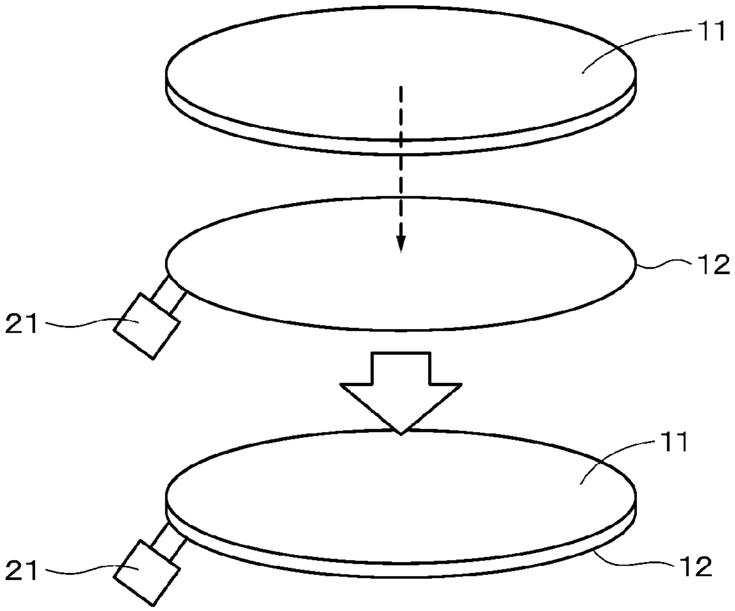
FIG. 5 is a diagram for describing a relationship between a negative electrode terminal and a flexible printed circuit (FPC) board according to an embodiment.
Figure 5:
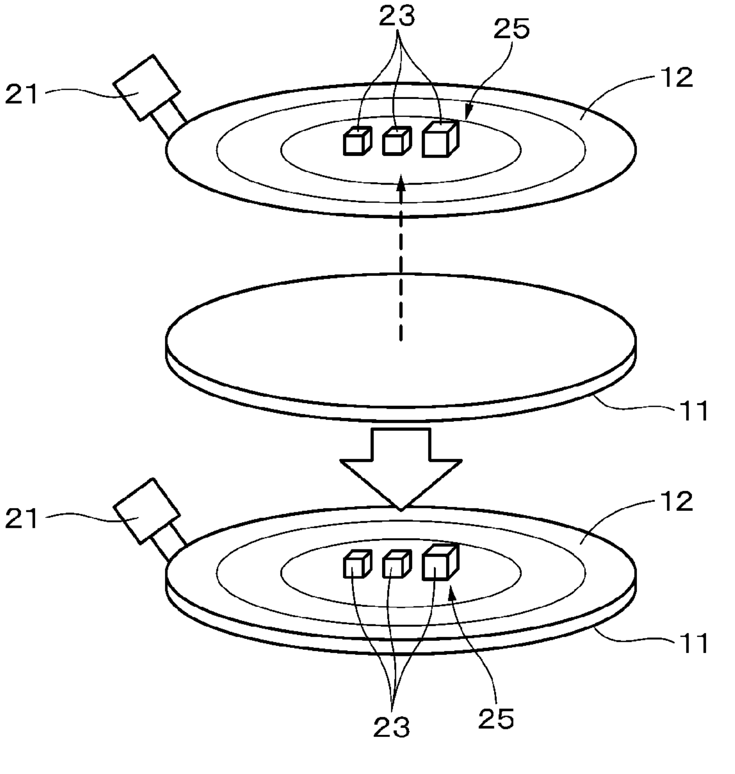

First, a configuration example of a secondary battery (a secondary battery 1) according to an embodiment will be described with reference to FIGS. 1 to 5. FIG. 1 is an overall view of the secondary battery 1, FIG. 2 is an exploded perspective view of the secondary battery 1, FIG. 3 is a sectional view of the secondary battery 1 taken along a line XA-XA in FIG. 1, FIG. 4 is a diagram for describing a negative electrode lid, and FIG. 5 is a diagram for describing a relationship between a negative electrode terminal and an FPC board.

As shown in FIG. 1, the secondary battery 1 is a coin-type battery having a substantially cylindrical shape as a whole. The secondary battery 1 has a negative electrode terminal 2, being an example of an external terminal, on an upper surface thereof. A portion other than the negative electrode terminal 2 in the secondary battery 1, for example, a peripheral surface or a bottom surface of the secondary battery 1 has a positive polarity, and functions as a positive electrode terminal 3. Note that, the secondary battery 1 may be a battery having a shape other than a coin shape such as a square shape.

Figure 2:
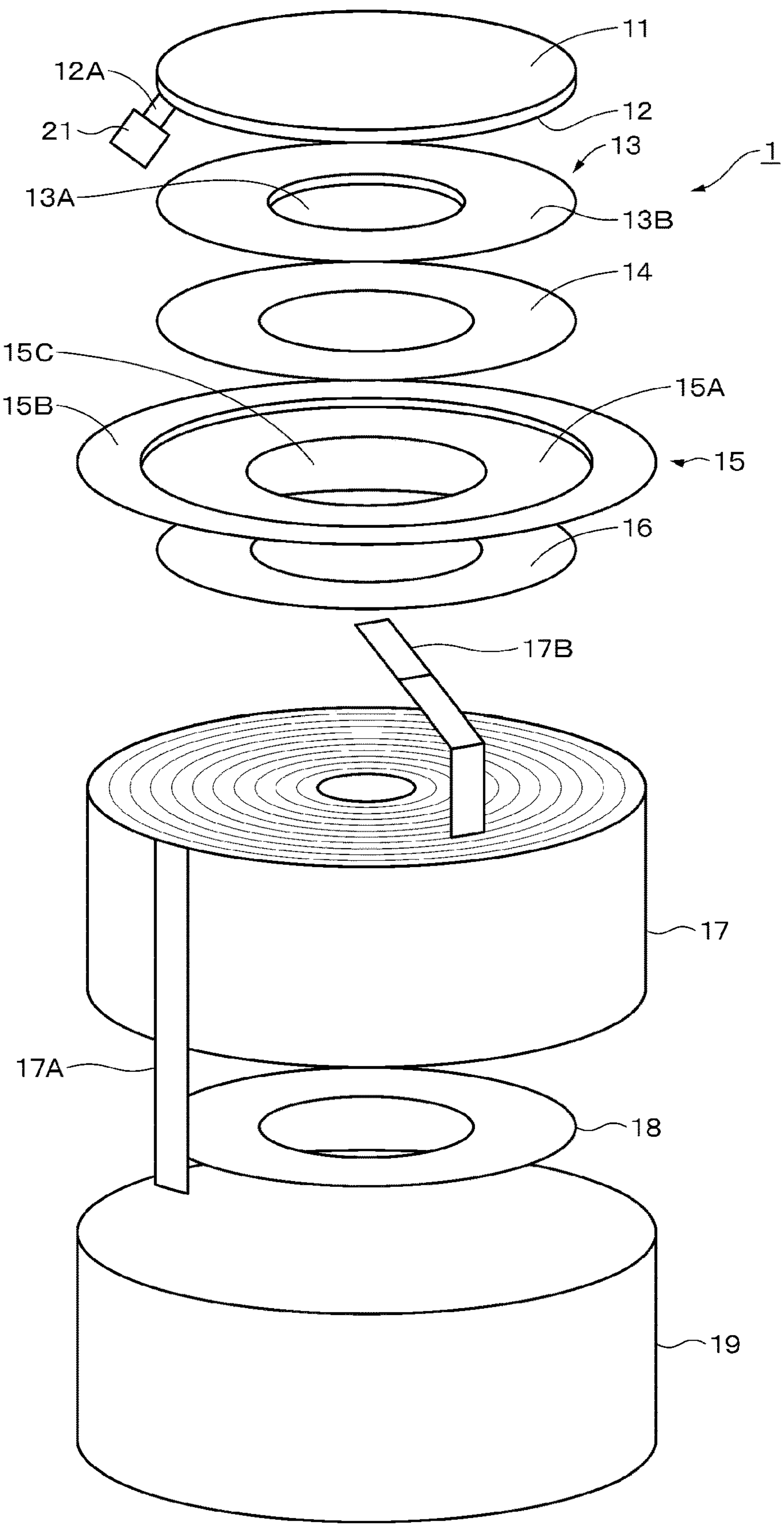
FIG. 2 is an exploded perspective view of the secondary battery according to an embodiment.

As shown in FIG. 2, the secondary battery 1 includes a negative electrode terminal 11, an FPC 12, a negative electrode lid 13, a sealant 14, a positive electrode lid 15, a top insulator 16, a battery element 17, a bottom insulator 18, and an outer can 19.

The negative electrode terminal 11 corresponds to the negative electrode terminal 2 described above. As the negative electrode terminal 11, for example, a metal plate in a thin plate-shape can be used. Specifically, as the negative electrode terminal 11, stainless steel with a nickel-plated surface can be used. In the present embodiment, the outer can 19 functions as the positive electrode terminal 3 with a positive polarity. Therefore, the negative electrode terminal 11 is electrically insulated from the outer can 19.

The FPC 12 is a board on which electronic components (electronic components 23) are mounted, and is a double-sided board or a multilayer board. As the double-sided board, a board on which a circuit pattern of copper foil (hereinafter, also simply referred to as a circuit pattern) is formed on both surfaces of a base substrate including a polyimide film or the like can be exemplified. Further, as the multilayer board, a board on which a plurality of base substrates each having a circuit pattern of copper foil formed on both surfaces or one surface are laminated can be exemplified. Examples of the electronic components 23 mounted on the FPC 12 include an IC, a resistor, a capacitor and the like that perform a protection operation of the secondary battery 1. Although details will be described later, a protection circuit 25 is formed by mounting predetermined electronic components 23 on one surface of the FPC 12, and electrically connecting them through a predetermined circuit pattern. The protection circuit 25 performs a process related to a known protection operation, for example, an operation of preventing overcurrent and overcharge.

The FPC 12 has a substantially circular shape. A belt-shaped portion 12A, being a belt-shaped FPC, extends outward from a predetermined portion in an outer edge of the FPC 12. Further, a lead-out portion 21 is electrically connected to the FPC 12. The lead-out portion 21 has, for example, a rectangular shape. As the lead-out portion 21, stainless steel with a nickel-plated surface can be used. The lead-out portion 21 is connected, for example, near a distal end of the belt-shaped portion 12A described above.

As the negative electrode lid 13, being an example of a second lid body, a metal plate in a thin plate-shape can be used. Specifically, stainless steel with a nickel-plated surface can be used as the negative electrode lid 13. As shown in FIG. 4, the negative electrode lid 13 has a hat-like shape as a whole, and specifically has a protrusion portion 13A (an example of a second protrusion portion) provided near the center. Note that, in FIG. 4, an orientation of the negative electrode lid 13 is shown upside down for ease of understanding. As shown in FIGS. 2 and 3, the protrusion portion 13A protrudes toward the inside of the outer can 19 (a lower side in FIGS. 2 and 3). A peripheral edge portion 13B in a ring shape is formed around the protrusion portion 13A. As shown in FIG. 3, the electronic components 23 constituting the protection circuit 25 are disposed between the negative electrode terminal 11 and the bottom surface of the protrusion portion 13A.

The sealant 14 has a ring-like shape. As the sealant 14, an insulating film can be applied. The sealant 14 is disposed between the negative electrode lid 13 and the positive electrode lid 15. For example, the sealant 14 is disposed between a protrusion portion of the positive electrode lid 15 (a protrusion portion 15A to be described later) and the peripheral edge portion 13B of the negative electrode lid 13, and is, for example, thermally fused to the positive electrode lid 15. The sealant 14 disposed in this manner electrically insulates the negative electrode lid 13 from the positive electrode lid 15.

As the positive electrode lid 15, being an example of a first lid body, a metal plate in a thin plate-shape can be used. Specifically, stainless steel with a nickel-plated surface can be used as the positive electrode lid 15. As shown in FIG. 2, the positive electrode lid 15 has the protrusion portion 15A (an example of a first protrusion portion) provided near the center. As shown in FIGS. 2 and 3, the protrusion portion 15A protrudes toward the inside of the outer can 19 (the lower side in FIGS. 2 and 3). A peripheral edge portion 15B in a ring shape is formed around the protrusion portion 15A. A diameter of the positive electrode lid 15 is substantially the same as the diameter of the outer can 19. As a result, as shown in FIG. 3, the positive electrode lid 15 can be placed and welded on a peripheral edge of the outer can 19. The lead-out portion 21 described above is welded to the upper surface of the peripheral edge portion 15B, and the positive electrode lid 15 and the lead-out portion 21 are electrically connected to each other. Furthermore, the lead-out portion 21 and the outer can 19 are electrically connected through the positive electrode lid 15.

An opening portion 15C in a circular shape is formed near the center of the protrusion portion 15A of the positive electrode lid 15. The protrusion portion 13A of the negative electrode lid 13 described above is electrically insulated and disposed so as not to come into contact with the protrusion portion 15A of the positive electrode lid 15, and protrudes along the peripheral edge of the opening portion 15C of the protrusion portion 15A (see FIG. 3). From another viewpoint, an outer side surface of the protrusion portion 15A protrudes toward an inner surface 19A of the outer can 19, and the protrusion portion 13A protrudes to penetrate the opening portion 15C. As a result, a bottom portion of the protrusion portion 13A is positioned inside the outer can 19 from the bottom portion of the protrusion portion 15A (closer to the battery element 17).

The top insulator 16 has a ring shape and is a member that insulates the positive electrode lid 15 from the battery element 17. Specifically, the top insulator 16 is a member that insulates the protrusion portion 15A of the positive electrode lid 15 from the battery element 17. As the top insulator 16, an insulating film or the like can be used.

The battery element 17 is, for example, a wound electrode body in which a positive electrode and a negative electrode are wound with a separator interposed therebetween. A positive electrode tab 17A (an example of a first electrode) and a negative electrode tab 17B (an example of a second electrode) are led out from predetermined portions of the battery element 17. As shown in FIG. 3, the positive electrode tab 17A is welded to, for example, an inner surface of the bottom portion of the outer can 19. Since the outer can 19 and the positive electrode lid 15 are electrically connected by welding, the positive electrode lid 15 and the positive electrode tab 17A are electrically connected. Note that, the positive electrode tab 17A may be welded to a side surface of the outer can 19. As a welding method, for example, resistance welding is used, but other welding methods such as ultrasonic welding may be used. As shown in FIG. 3, the negative electrode tab 17B is welded to the protrusion portion 13A of the negative electrode lid 13, for example. When the negative electrode lid 13 is electrically connected to the negative electrode terminal 11 through the FPC 12, the negative electrode terminal 11, the negative electrode lid 13, and the negative electrode tab 17B are electrically connected, and the metal plate constituting the negative electrode terminal 11 has a negative polarity.

The bottom insulator 18 is a member that insulates the battery element 17 from the bottom surface of the outer can 19. Specifically, an insulating film or the like can be used as the bottom insulator 18.

The outer can 19 is a metal member that houses the battery element 17 and the like described above. The positive electrode tab 17A is welded to the outer can 19, so that the outer can 19 has a positive polarity.

FIGS. 5A and 5B are diagrams illustrating the negative electrode terminal 11 and the FPC 12 taken out. Note that, FIGS. 5A and 5B illustrate the configuration of the negative electrode terminal 11 and the FPC 12 upside down. The negative electrode terminal 11 and the FPC 12 are electrically connected by, for example, solder.

Note that, the negative electrode lid 13 is connected to a surface of the FPC 12 opposite to the surface to which the negative electrode terminal 11 is connected. The FPC 12 and the negative electrode lid 13 may be connected by solder, but the FPC 12 and the negative electrode lid 13 are preferably electrically connected by a conductive adhesive 22 (see FIG. 3). For example, in a case where the negative electrode tab 17B is connected to the negative electrode lid 13, the FPC 12 and the negative electrode lid 13 can be electrically connected without causing thermal damage to the battery element 17 by using the conductive adhesive 22 instead of soldered joints.

The conductive adhesive 22 contains, for example, a conductive filler and a binder. As the conductive filler, silver, nickel, gold, palladium, carbon, or the like can be used. Further, as the binder, an epoxy resin, a urethane resin, a silicone resin, a synthetic rubber, or the like can be used. Among these materials, those with high adhesiveness to metal and low resistance are preferable. For example, a conductive adhesive of epoxy silver paste is preferable.

As shown in FIG. 3, the FPC 12 is connected between the negative electrode terminal 11 and the negative electrode lid 13 by a connection using such soldered joints or a conductive adhesive.

Figure 6:
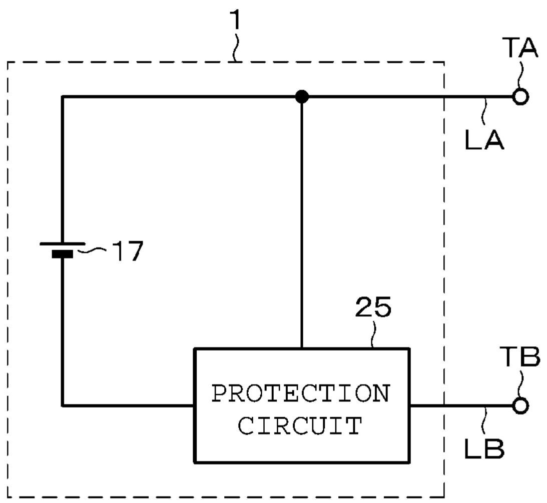
FIG. 6 is a diagram for describing a circuit configuration example of the secondary battery according to an embodiment.
Figure 6:
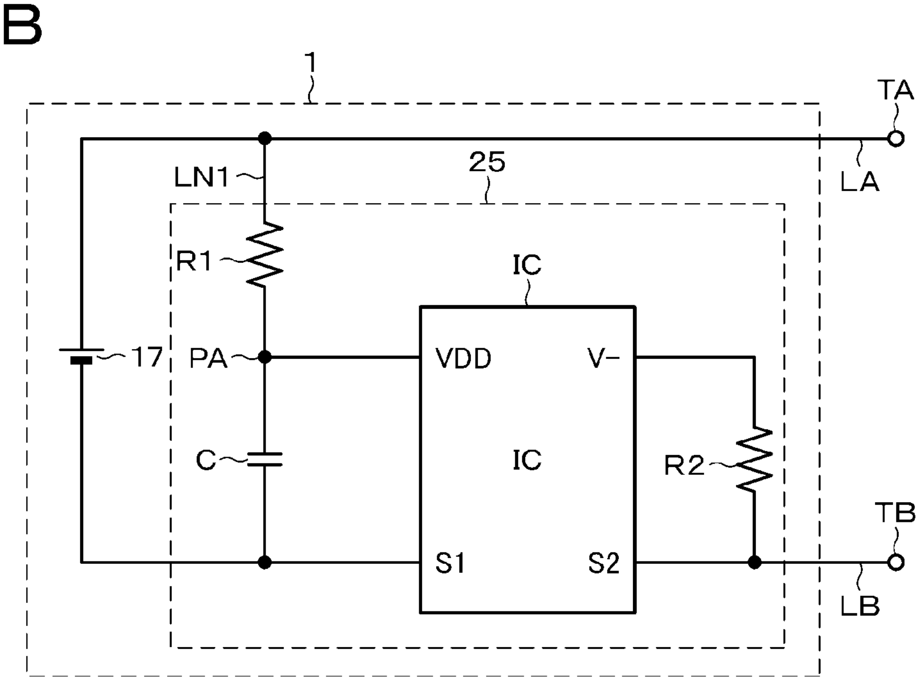

FIGS. 6A and 6B show a circuit configuration example of the secondary battery 1. A line LA is connected to an appropriate portion of the outer can 19 of the secondary battery 1, and a positive electrode external output terminal TA is led out through the line LA. Further, a line LB is connected to an appropriate portion of the negative electrode terminal 11 of the secondary battery 1, and a negative electrode external output terminal TB is led out through the line LB. As shown in FIG. 6A, the protection circuit 25 is connected to, for example, the line LB.

As shown in FIG. 6B, the protection circuit 25 includes, for example, a protection IC, a resistor R1, a resistor R2, and a capacitor C as an example of the electronic components 23. The resistor R1 and the capacitor C are connected in series on a line LN1 connecting the line LA and the line LB. A connection point PA between the resistor R1 and the capacitor C is connected to a power source port VDD of the protection IC.

The protection IC includes a discharge control field effect transistor (FET) and a charge control FET. Sources S1 and S2 of the respective FETs are connected to the line LB. Normally, both the discharge control FET and the charge control FET are turned on. When discharge is prohibited, the discharge control FET is turned off. When charging is prohibited, the charge control FET is turned off. When charging and discharging are prohibited, both the discharge control FET and the charge control FET are turned off.

The resistor R2 is connected between a port V− of the protection IC and the line LB. The resistor R2 functions as, for example, a current detection resistor. The protection IC detects a magnitude and direction of a current flowing through the circuit to which the secondary battery 1 is connected by detecting the current flowing through the resistor R2. According to detection results, the protection IC performs appropriate protection operations such as overcurrent prevention.

Figure 7:
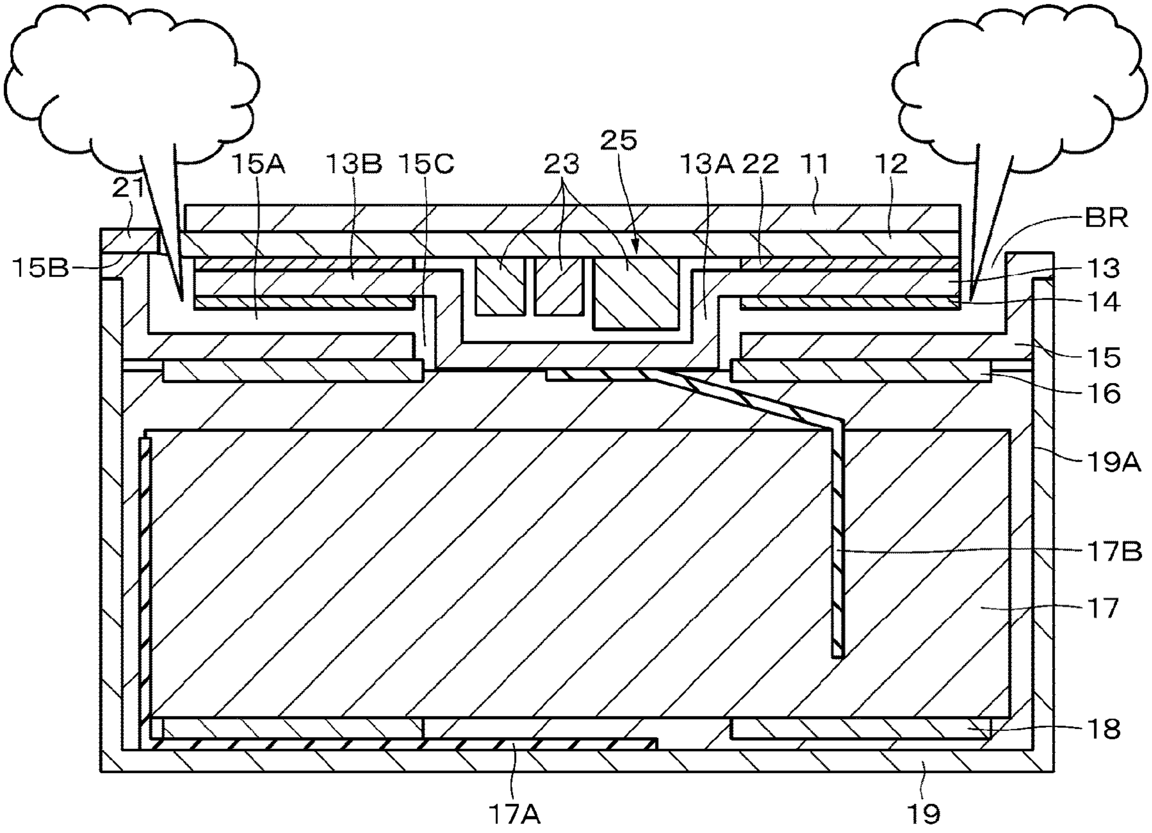
FIG. 7 is a diagram for describing a pressure release mechanism included in the secondary battery according to an embodiment.

Next, a pressure release mechanism of the secondary battery 1 will be described. In a case where an internal pressure of the outer can 19 becomes equal to or higher than a certain level due to an internal short circuit of the battery element 17, heating from the outside of the secondary battery 1, or the like, it is desirable to release the pressure to the outside of the outer can 19. In the secondary battery 1, a sealant 14 slightly inferior in strength is interposed between the negative electrode lid 13 and the positive electrode lid 15. As a result, as schematically shown in FIG. 7, in a case where the internal pressure of the secondary battery 1 becomes equal to or higher than a certain level, the negative electrode terminal 11 and the like can be easily removed due to cracking of the sealant 14 and the like. When the negative electrode terminal 11 and the like are removed, a gas release path BR connecting a space in which the battery element 17 is housed and an external space is formed, and gas in the secondary battery 1 can be released to the outside.

Next, an example of a circuit pattern formed in the FPC 12 will be described. First, a first example of a circuit pattern formed in the FPC 12 will be described with reference to FIGS. 8A and 8B.

Figure 8:
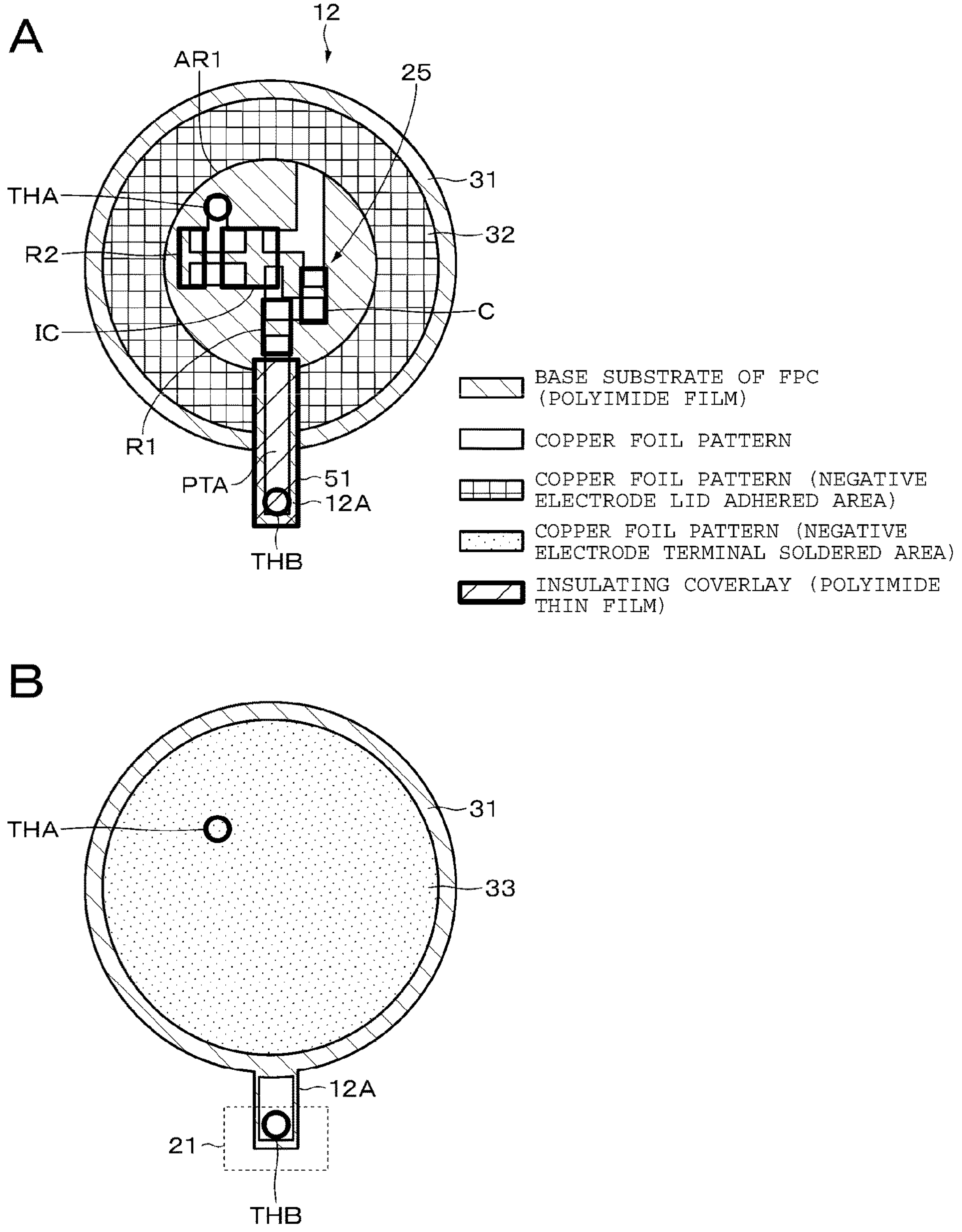
FIG. 8 is a diagram for describing a first example of a circuit pattern formed in the FPC according to an embodiment.

The negative electrode lid 13 is electrically connected to a surface of the FPC 12 shown in FIG. 8A (hereinafter, also referred to as an AA surface as appropriate) by a conductive adhesive. Further, the negative electrode terminal 11 is electrically connected to a surface of the FPC 12 shown in FIG. 8B (hereinafter, also referred to as a BB surface as appropriate) by solder. The FPC 12 according to the present example is a double-sided (two-layer) board in which circuit patterns are formed on both surfaces of a base substrate 31 (an example of an insulating layer) including, for example, a polyimide film.

Near the peripheral edge of the AA surface of the FPC 12 is a base substrate 31 provided with no circuit pattern. A circuit pattern 32 (a first conductive layer in the present example) that is a ring-shaped region is provided inside the base substrate 31. The circuit pattern 32 is a region to which the peripheral edge portion 13B of the negative electrode lid 13 is adhered.

A circular region AR1 having substantially the same diameter as the diameter of the protrusion portion 13A is provided inside the circuit pattern 32, and the protection circuit 25 is provided in this region. The protection circuit 25 is provided to fit in a space in the protrusion portion 13A of the negative electrode lid 13. The protection IC, the resistor R1, the resistor R2, and the capacitor C constituting the protection circuit 25 are electrically connected by a circuit pattern PTA of a predetermined copper foil provided on the base substrate 31. The circuit pattern PTA is connected to each of a through hole THA that penetrates the AA surface and the BB surface of the FPC 12, the circuit pattern 32, and a through hole THB that penetrates the AA surface and the BB surface of the FPC 12 and is provided near the distal end of the belt-shaped portion 12A.

On the BB surface of the FPC 12, a circuit pattern 33 in a substantially circular shape (a second conductive layer in the present example) is provided inside the base substrate 31 at the peripheral edge. The circuit pattern 33 is a region in which the negative electrode terminal 11 is connected by solder. The circuit pattern 33 is provided with the through hole THA.

The through hole THB is provided at the distal end of the belt-shaped portion 12A, and the lead-out portion 21 is connected to this portion. The lead-out portion 21 is connected to the FPC 12 by, for example, solder. As described above, the lead-out portion 21 is welded to the positive electrode lid 15.

Since the through hole THB is connected to a positive electrode side, a short circuit occurs when the negative electrode lid 13 comes into contact with the circuit pattern between the through hole THB and the protection circuit 25. Therefore, an insulating portion 51 is provided at least at a portion of the circuit pattern PTA that comes into contact with the negative electrode lid 13. In the present example, the insulating portion 51 is provided to cover all of the through hole THB and the circuit pattern between the through hole THB and the electronic components (for example, the resistor R1). As the insulating portion 51, for example, a thin film of polyimide film can be used.

With the above configuration, in the protection circuit 25, the through hole THB serves as a contact point on the positive electrode side, and a connection portion between the through hole THA and the circuit pattern PTA, and the circuit pattern 32 serves as a contact point (two points) on a negative electrode side. As a result, electric power of the battery element 17 can be supplied to the protection IC, and the circuit configuration shown in FIG. 6 can be realized.

Figure 9:
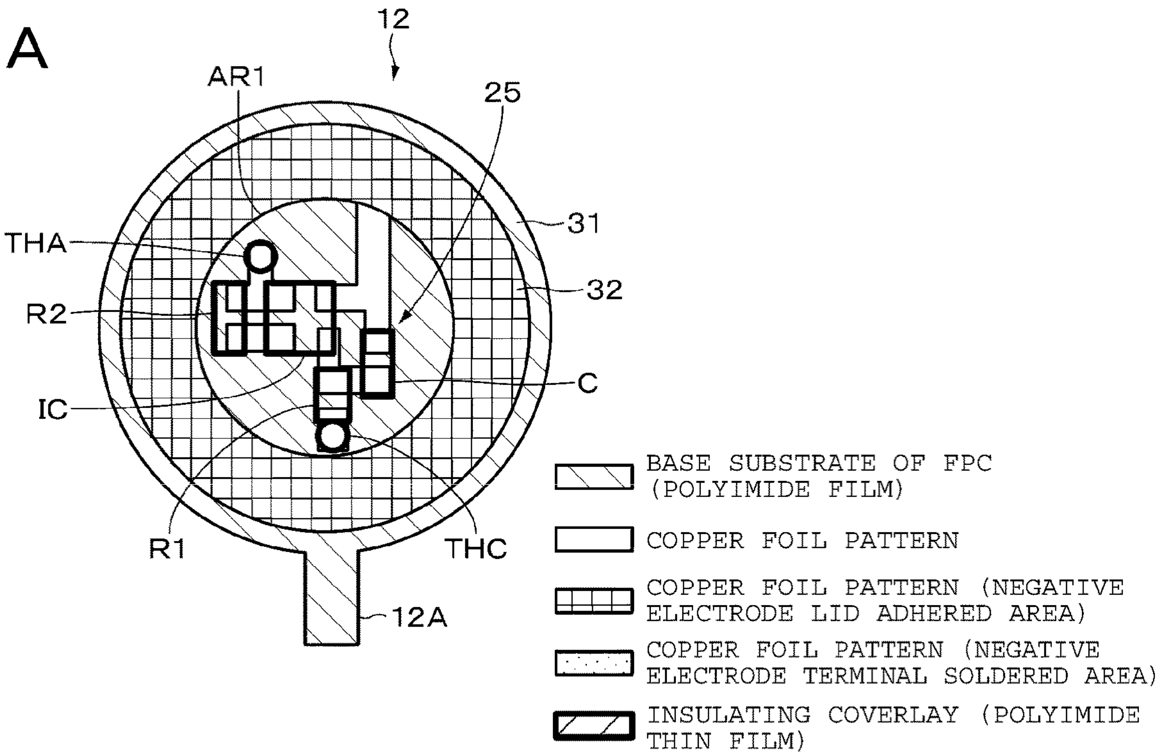
FIG. 9 is a diagram for describing a second example of the circuit pattern formed in the FPC according to an embodiment.
Figure 9:
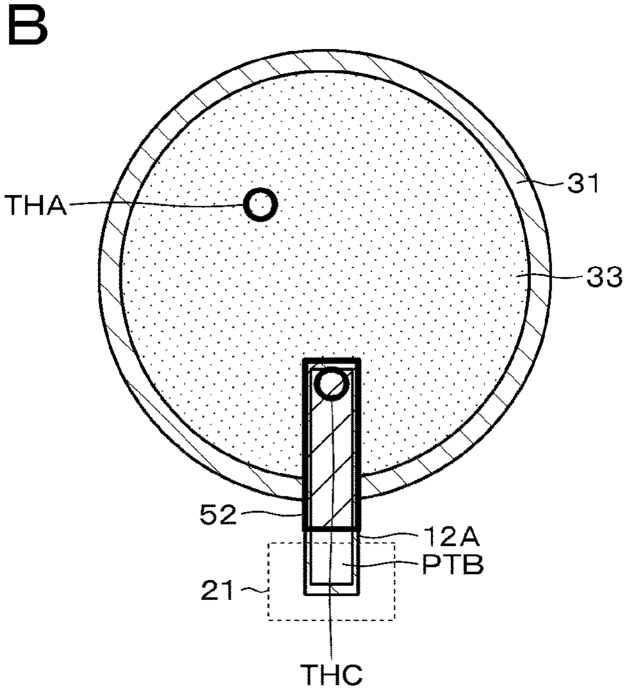

Next, the circuit pattern formed in the FPC 12 will be described with reference to FIGS. 9A and 9B. Note that, the same configurations as those described above are denoted by the same reference numerals, and redundant description will be omitted as appropriate.

In an embodiment, the through hole THB is not provided, and a through hole THC penetrating the AA surface and the BB surface is provided in the region AR1. As shown in FIG. 9B, the through hole THC on the BB surface is connected to the lead-out portion 21 through the circuit pattern PTB. In other words, the through hole THC is connected to the positive electrode side. When the circuit pattern PTB connected to the through hole THC and the negative electrode terminal 11 come into contact with each other, a short circuit occurs. Therefore, an insulating portion 52 is provided to cover at least a contact portion with the negative electrode terminal 11 in the circuit pattern PTB. As the insulating portion 52, for example, a thin film of polyimide film can be used.

Next, the circuit pattern formed in the FPC 12 will be described with reference to FIGS. 10A to 10C. The FPC 12 is, for example, a five-layer multilayer board. For example, a layer of the circuit pattern 32 corresponds to a first layer (the first conductive layer in the present example), the base substrate 31 on which the layer of the circuit pattern 32 is provided corresponds to a second layer, the layer of the circuit pattern provided on the side opposite to the circuit pattern 32 of the base substrate 31 corresponds to a third layer (a third conductive layer in the present example (a conductive layer disposed between the first conductive layer and the second conductive layer)), the base substrate disposed below the third layer corresponds to a fourth layer, and the circuit pattern provided below the base substrate corresponds to a fifth layer (the second conductive layer in the present example). A pattern shown in FIG. 10A is different from the pattern shown in FIG. 9A in that a through hole THD is provided in the belt-shaped portion 12A.

Figure 10:
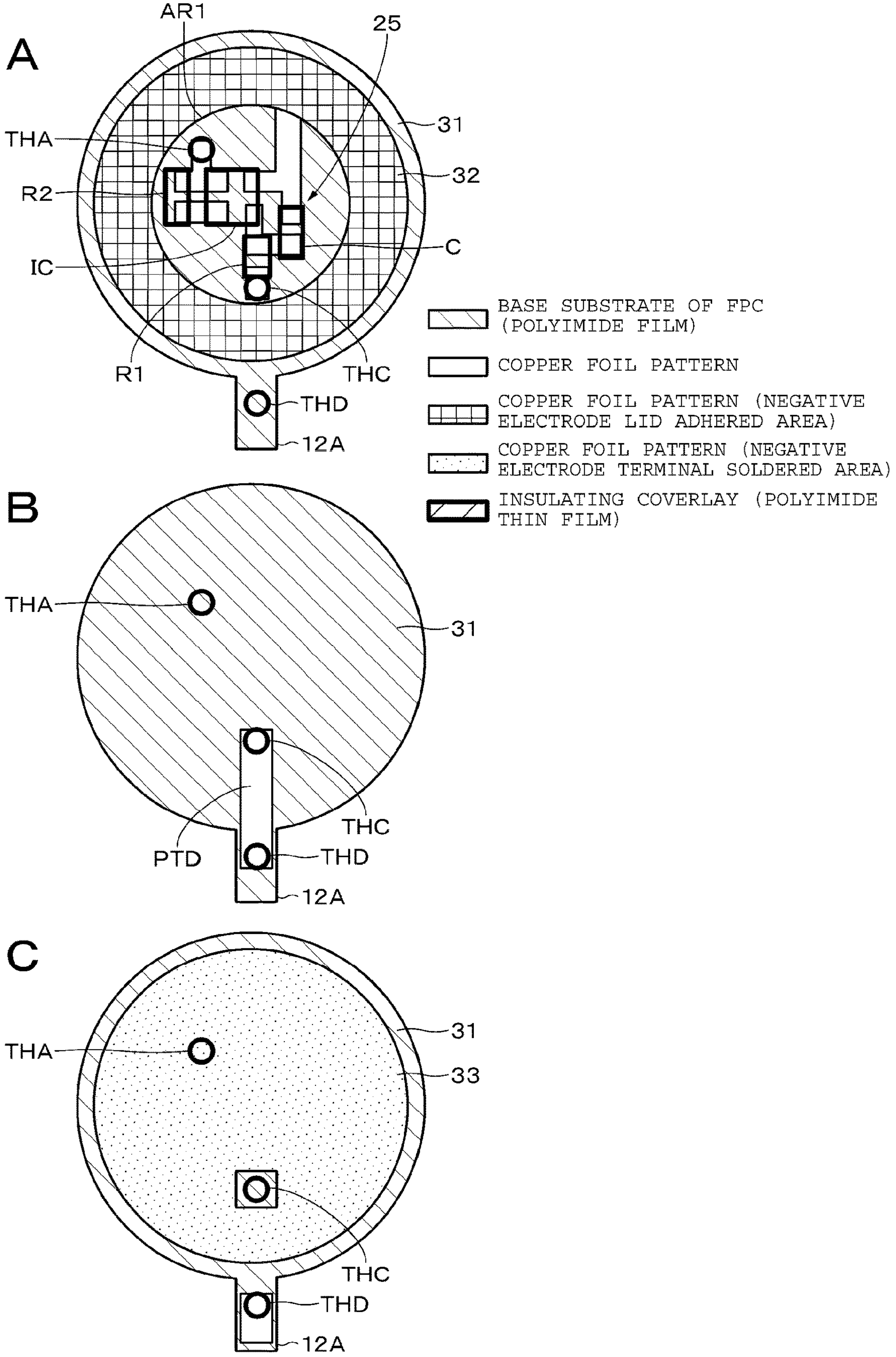
FIG. 10 is a diagram for describing a third example of the circuit pattern formed in the FPC according to an embodiment.

As shown in FIG. 10B, the through hole THC (a first through hole in the present example) and the through hole THD (a second through hole in the present example) are connected by a circuit pattern PTD formed in the third layer. As shown in FIG. 10C, the circuit pattern 33 is not formed at the portion of the through hole THC in the fifth layer. The through hole THD is connected to the lead-out portion 21.

According to an embodiment, the through hole THC and the through hole THD are connected by the circuit pattern PTD of the third layer. In other words, there is no circuit pattern extending from the through hole connected to the lead-out portion 21 at the portion to which the negative electrode lid 13 and the negative electrode terminal 11 are connected. With such a configuration, it is possible to eliminate the configuration related to the insulating portion required in the first example and the second example.

As described above, in the present embodiment, the positive electrode lid 15 is provided with the protrusion portion 15A, and the opening portion 15C is provided near the center of the protrusion portion 15A. By providing the opening portion 15C, it is possible to provide the protrusion portion 13A that projects toward the inside of the outer can 19 by a certain amount or more on the negative electrode lid 13.

Figure 11:
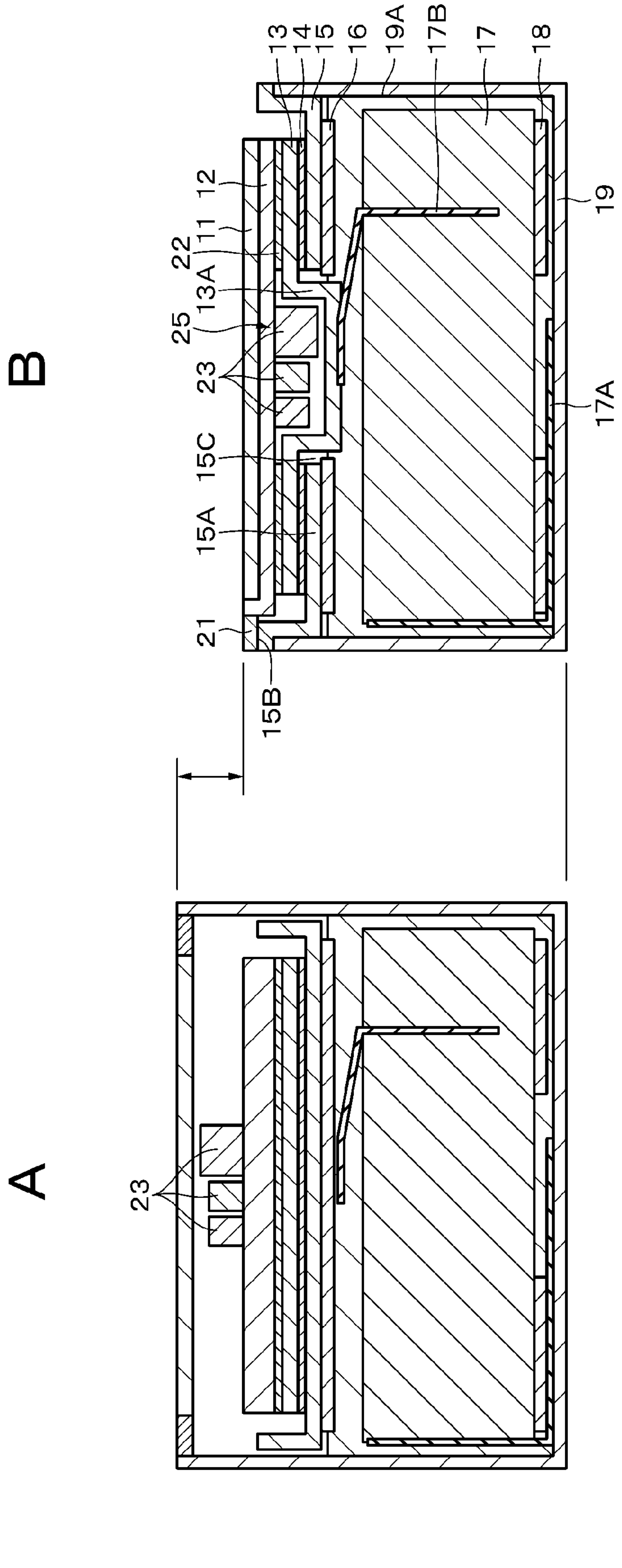
FIG. 11 is a diagram for describing an example of effects obtained by the secondary battery according to an embodiment.

In a configuration of a general coin-type secondary battery, as schematically shown in FIG. 11A, electronic components 23 constituting the protection circuit 25 are mounted on an outer surface of a circuit board. A thickness of the secondary battery increases by the space for arranging the electronic components 23. According to the present embodiment, as shown in FIG. 11B, it is possible to provide a space in which the electronic components 23 can be efficiently arranged in the protrusion portion 13A protruding toward the inside of the outer can 19. Therefore, it is possible to prevent the thickness of the secondary battery 1 from increasing due to the space for arranging the electronic components 23.

Further, since a storage space of the battery element 17 and the space where the protection circuit 25 is disposed can be isolated (blocked) by the negative electrode lid 13, the electronic components 23 constituting the protection circuit 25 can be protected in a case where electrolytic solution of the battery element 17 leaks.

Since the protection circuit 25 can be built into the secondary battery 1, it is not necessary to pack the secondary battery 1. As a result, a user can handle the secondary battery 1 more safely and easily.

A configuration is also conceivable in which a protection circuit is provided in a device on a main body side to which the secondary battery is applied. However, in such a configuration, when a secondary battery without a protection circuit is used, there is a high possibility that inconvenience such as short circuit will occur. In the present embodiment, since the protection circuit 25 is built into the secondary battery 1, it is not necessary to consider whether or not the secondary battery has a protection circuit.

The contents of the present technology are not limited herein, and various modifications based are contemplated according to an embodiment.

Figure 12:
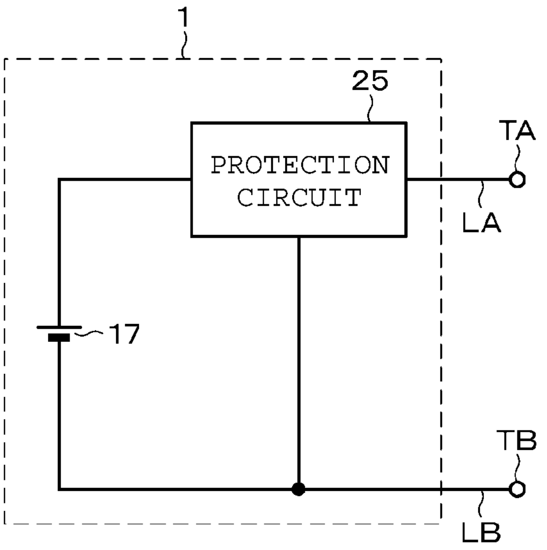
FIG. 12 is a diagram for describing an example according to an embodiment.

The configurations of the positive electrode and the negative electrode may be opposite. For example, the negative electrode terminal 11 may be a positive electrode terminal, and the outer can 19 may be configured to have a negative polarity. In such a configuration, as shown in FIG. 12, the protection circuit 25 may be connected to the line LA.

Figure 13:
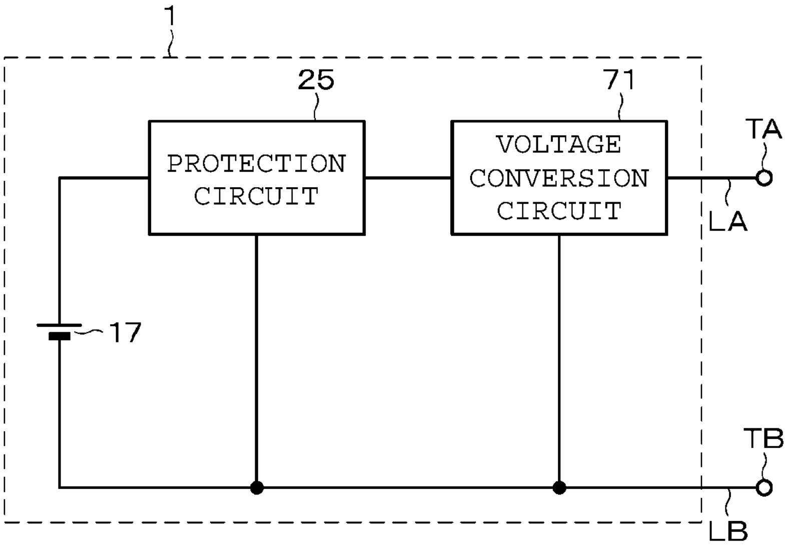
FIG. 13 is a diagram for describing an example according to an embodiment.
Figure 14:
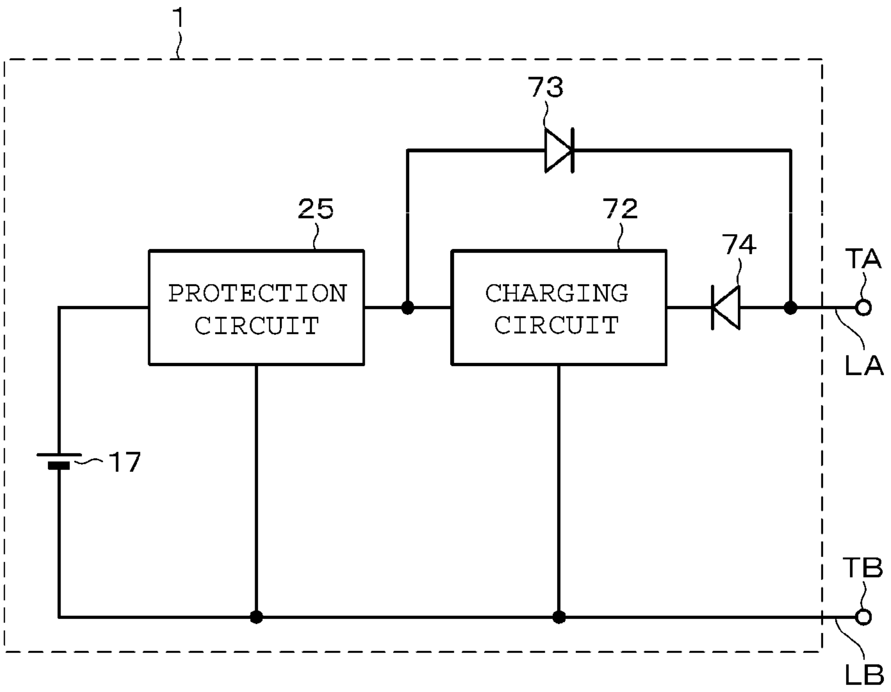
FIG. 14 is a diagram for describing an example according to an embodiment.

Further, the secondary battery 1 may have a circuit other than the protection circuit 25. For example, as shown in FIG. 13, a voltage conversion circuit 71 such as a direct current (DC)-DC converter may be connected between the protection circuit 25 and the positive electrode external output terminal TA in the line LA. Further, as shown in FIG. 14, a charging circuit 72 may be connected between the protection circuit 25 and the positive electrode external output terminal TA in the line LA. A diode 73 is connected between the connection point between the protection circuit 25 and the charging circuit 72 and the positive electrode external output terminal TA. An anode of the diode 73 is connected to the connection point between the protection circuit 25 and the charging circuit 72, and a cathode is connected to the connection point between the charging circuit 72 and the positive electrode external output terminal TA. A diode 74 is connected between the charging circuit 72 and the positive electrode external output terminal TA. The anode of the diode 74 is connected to the positive electrode external output terminal TA, and the cathode of the diode 74 is connected to the charging circuit 72. With such a configuration, electric power can be supplied from the secondary battery 1 during discharging, and the secondary battery 1 can be charged by supplying electric power to the secondary battery 1 from an external device connected to a universal serial bus (USB), for example.

Similarly to the electronic components constituting the protection circuit 25, the electronic components constituting the voltage conversion circuit 71 and the charging circuit 72 are also disposed between the external terminal (for example, the negative electrode terminal 11) and the second protrusion portion (for example, the protrusion portion 13A).

Figure 15:
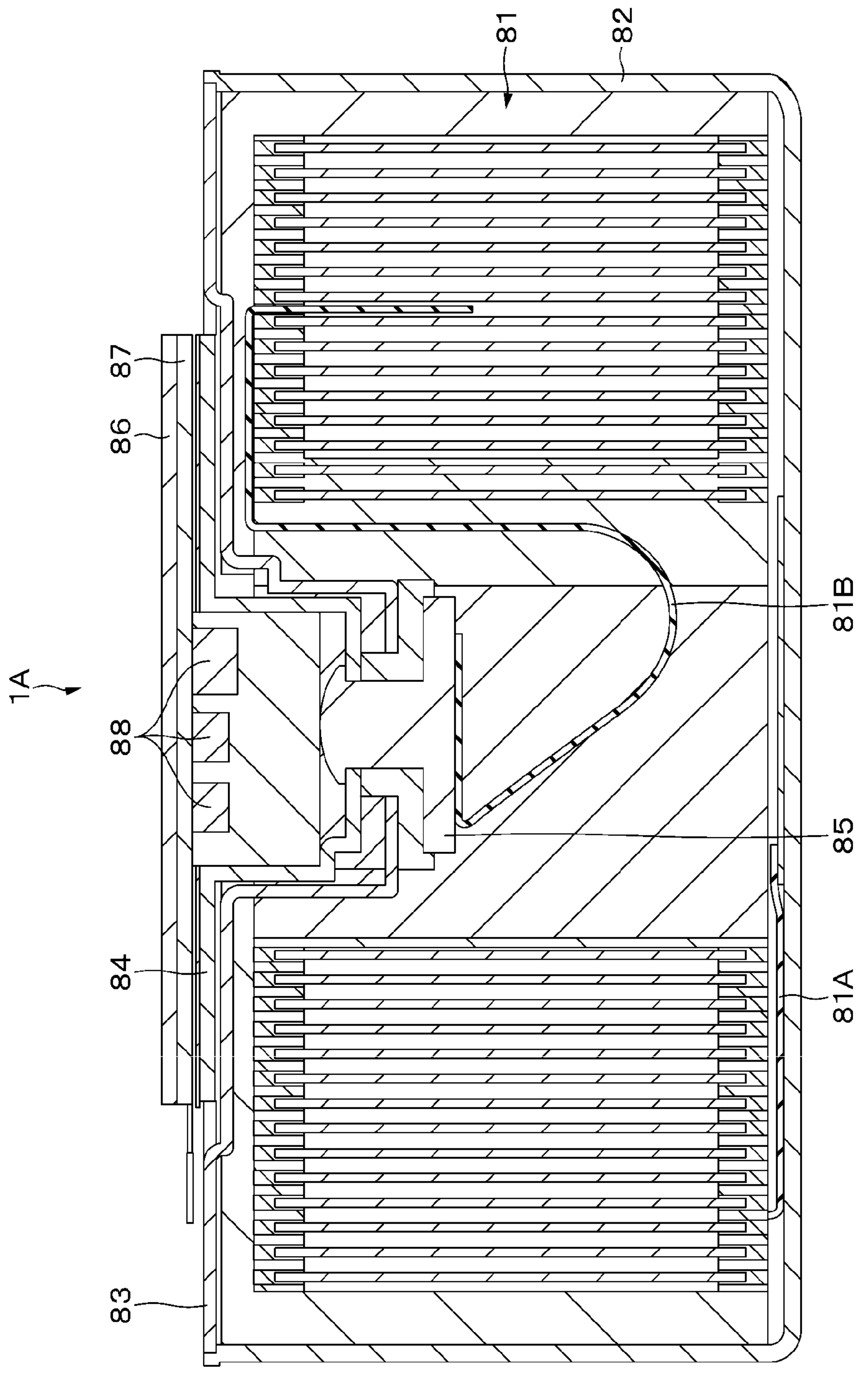
FIG. 15 is a diagram for describing an example according to an embodiment.

FIG. 15 is a sectional view of a secondary battery 1A according to a modification example. The secondary battery 1A includes a battery element 81. A negative electrode tab 81A led out from the battery element 81 is welded to a battery can 82. Further, similarly to the secondary battery 1, in the secondary battery 1A, a negative electrode lid 83 and a positive electrode lid 84 are provided, and each of the negative electrode lid 83 and the positive electrode lid 84 has a protrusion portion protruding toward the inside of the battery can 82. A rivet 85 is driven into the protrusion portion of the positive electrode lid 84, and the protrusion portion is crimped by the rivet 85. A positive electrode tab 81B led out from the battery element 81 is connected to the rivet 85. Further, the secondary battery 1A has a positive electrode terminal 86, and the positive electrode lid 84 and the positive electrode terminal 86 are connected through a circuit board 87. A protection circuit 88 is mounted on the circuit board 87. The electronic components constituting the protection circuit 88 are disposed in the protrusion portion of the positive electrode lid 84. As described above, the present technology is also applicable to a secondary battery in which rivets are used. Of course, in the configuration of the secondary battery 1A, the configurations of the positive electrode and the negative electrode may be opposite.

The matters described in the above-described embodiments including modification example can be appropriately combined. Further, the materials, processes, and the like described in the embodiments are merely examples, and the contents of the present technology are not limited thereto.

The secondary battery according to an embodiment can be mounted on an electric tool, an electric vehicle, various electronic devices, or the like, or can be used for supplying electric power.

A specific application example will be described. For example, the secondary battery described above can be used as a power source of a wearable device having a function of a portable information terminal, that is, a so-called wearable terminal. Examples of the wearable terminal include a wristwatch-type terminal and a glasses-type terminal, but are not limited thereto.

Figure 16:
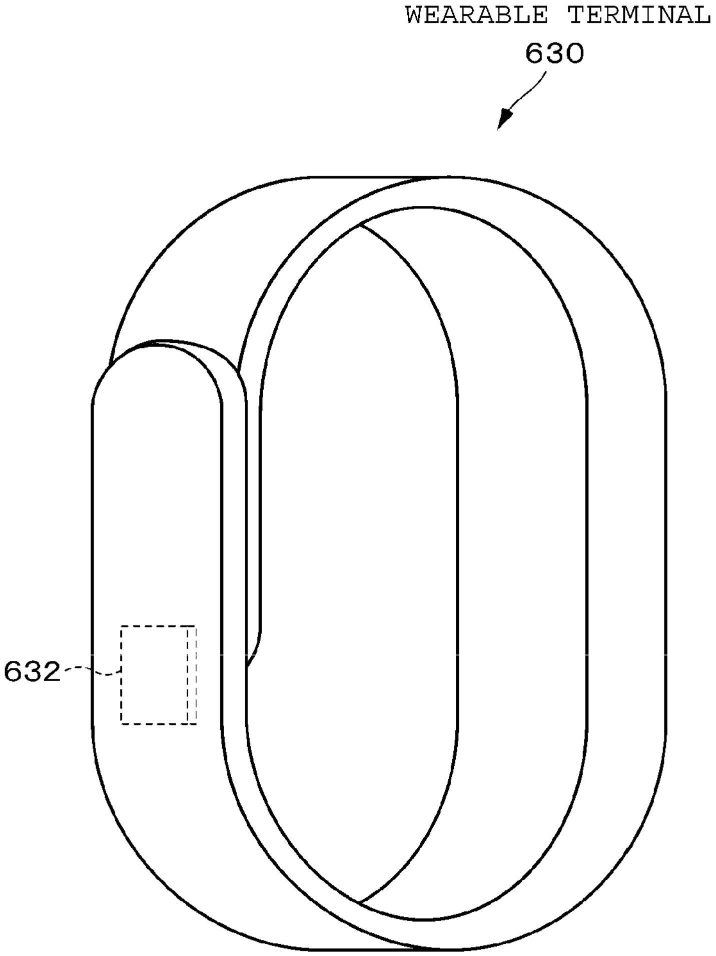
FIG. 16 is a diagram for describing an application example according to an embodiment.
Figure 17:
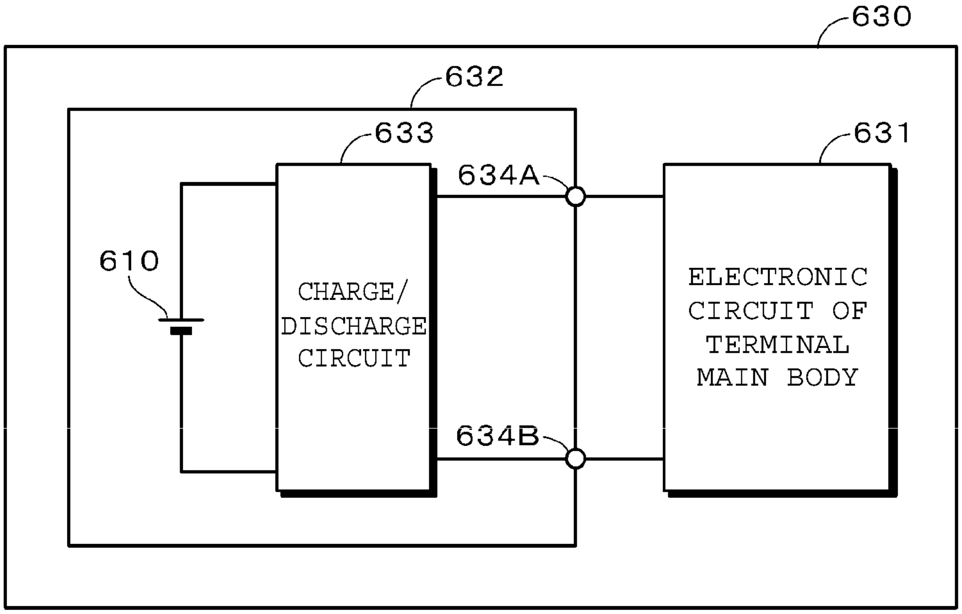
FIG. 17 is a diagram for describing an application example according to an embodiment.

FIG. 16 illustrates an example of a wearable terminal with a built-in secondary battery. As shown in FIG. 16, a wearable terminal 630 according to the application example is a wristwatch-type terminal, and includes a secondary battery module 632 therein. The secondary battery according to an embodiment can be applied as the secondary battery module 632. The wearable terminal 630 can be worn and used by the user. The wearable terminal 630 may be a deformable flexible terminal.

As shown in FIG. 16, the wearable terminal 630 according to the application example includes an electronic circuit 631 of an electronic device main body and a secondary battery module 632. The secondary battery module 632 is electrically connected to the electronic circuit 631. The wearable terminal 630 has, for example, a configuration in which the secondary battery module 632 is detachable by the user. Note that, the configuration of the wearable terminal 630 is not limited thereto, and may have a configuration in which the secondary battery module 632 is built into the wearable terminal 630 so that the secondary battery module 632 cannot be removed from the wearable terminal 630 by the user.

When the secondary battery module 632 is charged, a positive electrode terminal 634A and a negative electrode terminal 634B of the secondary battery module 632 are connected to a positive electrode terminal and a negative electrode terminal of a charger (not illustrated), respectively. On the other hand, when the secondary battery module 632 is discharged (when the wearable terminal 630 is used), the positive electrode terminal 634A and the negative electrode terminal 634B of the secondary battery module 632 are connected to the positive electrode terminal and the negative electrode terminal of the electronic circuit 631, respectively.

The electronic circuit 631 includes, for example, a CPU, a peripheral logic unit, an interface unit, a storage unit, and the like, and controls the entire wearable terminal 630.

The secondary battery module 632 includes a secondary battery cell 610 (the secondary battery 1 and the like in the embodiment) and a charge/discharge circuit 633. The charge/discharge circuit 633 is mounted on, for example, the FPC 12 in the embodiment.

In the present application example, an example in which the present invention is applied to the secondary battery module 632 has been described, but the secondary battery according to an embodiment may be mounted on the electronic circuit 631 of the electronic device main body.

DESCRIPTION OF REFERENCE SYMBOLS

1, 1A: Secondary battery
11: Negative electrode terminal
12: FPC
13: Negative electrode lid
13A: Protrusion portion
14: Sealant
15: Positive electrode lid
15A: Protrusion portion
15B: Peripheral edge portion
15C: Opening portion
17: Battery element
17A: Positive electrode tab
17B: Negative electrode tab
19: Outer can
21: Lead-out portion
23: Electronic component
25: Protection circuit
51, 52: Insulating portion
THA, THC, THD: Through hole It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
an outer can;
an external terminal insulated from the outer can;
a battery element that is housed in the outer can and has a first electrode and a second electrode;
a first lid body having a first protrusion portion that protrudes toward an inside of the outer can; and
a second lid body disposed to be electrically insulated from the first lid body, wherein
the first protrusion portion of the first lid body has an opening portion,
the second lid body has a second protrusion portion that is electrically insulated from the first protrusion portion and penetrates the opening portion toward the inside of the outer can, and
a circuit board is connected between the external terminal and the second lid body, and
the external terminal, the second lid body, and the second electrode are electrically connected to each other, and
the first lid body and the first electrode are electrically connected to each other.

2. The secondary battery according to claim 1, wherein
the circuit board is a board on which electronic components are mounted, and wherein the board is a double-sided board or a multilayer board.

3. The secondary battery according to claim 2, wherein
the electronic components are disposed between the external terminal and the second protrusion portion.

4. The secondary battery according to claim 1, wherein
a lead-out portion is connected to the circuit board, and the lead-out portion is electrically connected to the outer can.

5. The secondary battery according to claim 4, wherein
the circuit board includes a first conductive layer electrically connected to the second lid body, a second conductive layer electrically connected to the external terminal, and an insulating layer interposed between the first conductive layer and the second conductive layer, and
a through hole penetrating the first conductive layer, the second conductive layer, and the insulating layer, the lead-out portion, and electronic components mounted on the circuit board are electrically connected by a pattern formed on the circuit board.

6. The secondary battery according to claim 5, wherein
the lead-out portion is connected to the second conductive layer,
the pattern is formed on the same surface as the first conductive layer, and
an insulating portion is provided at least at a portion of the pattern that comes into contact with the second lid body.

7. The secondary battery according to claim 5, wherein
the lead-out portion is connected to the second conductive layer,
the pattern is formed on the same surface as the second conductive layer, and
an insulating portion is provided at least at a portion of the pattern that comes into contact with the external terminal.

8. The secondary battery according to claim 4, wherein
the circuit board includes a first conductive layer electrically connected to the second lid body, a second conductive layer electrically connected to the external terminal, a third conductive layer disposed between the first conductive layer and the second conductive layer, a first through hole connected to a circuit pattern provided in the first conductive layer, and a second through hole that is provided in the second conductive layer and connected to the lead-out portion, and
the first through hole and the second through hole are electrically connected by the third conductive layer.

9. The secondary battery according to claim 1, wherein
the first protrusion portion protrudes along an inner surface of the outer can, and
the second protrusion portion protrudes to penetrate the opening portion.

10. The secondary battery according to claim 1, wherein
a bottom portion of the second protrusion portion is positioned inside the outer can from the bottom portion of the first protrusion portion.

11. The secondary battery according to claim 1, wherein
a sealant is provided between a peripheral edge portion of the second protrusion portion and the first protrusion portion.

12. The secondary battery according to claim 1, wherein
the circuit board and the second lid body are electrically connected by a conductive adhesive, and the circuit board and the external terminal are electrically connected by solder.

13. An electronic device comprising the secondary battery according to claim 1.

* * * * *